US012070435B2

(12) United States Patent
Huang

(10) Patent No.: US 12,070,435 B2
(45) Date of Patent: Aug. 27, 2024

(54) TRIGGER POINT AND ACUPOINT STIMULATOR

(71) Applicant: Guo-Luen Huang, Taipei (TW)

(72) Inventor: Guo-Luen Huang, Taipei (TW)

( * ) Notice: Subject to any disclaimer, the term of this patent is extended or adjusted under 35 U.S.C. 154(b) by 746 days.

(21) Appl. No.: 17/276,600

(22) PCT Filed: Sep. 16, 2019

(86) PCT No.: PCT/CN2019/106007
§ 371 (c)(1),
(2) Date: Mar. 16, 2021

(87) PCT Pub. No.: WO2020/057468
PCT Pub. Date: Mar. 26, 2020

(65) Prior Publication Data
US 2021/0259920 A1 Aug. 26, 2021

Related U.S. Application Data

(60) Provisional application No. 62/732,144, filed on Sep. 17, 2018.

(51) Int. Cl.
*A61H 39/04* (2006.01)

(52) U.S. Cl.
CPC ..... *A61H 39/04* (2013.01); *A61H 2201/1238* (2013.01)

(58) Field of Classification Search
CPC ............ A61H 39/04; A61H 2201/1238; A61H 2201/10; A61M 5/30; A61M 2205/123;
(Continued)

(56) References Cited

U.S. PATENT DOCUMENTS

2002/0188249 A1* 12/2002 Landau .................. A61M 5/30 604/68
2008/0015474 A1* 1/2008 Quinn .................... A61H 9/005 601/6
(Continued)

FOREIGN PATENT DOCUMENTS

CN 88205972 U 12/1988
CN 202161538 U * 3/2012
(Continued)

OTHER PUBLICATIONS

English Translation of CN 202161538 (Year: 2012).*
(Continued)

*Primary Examiner* — Mohamed G Gabr
*Assistant Examiner* — Aman Kumar Mann

(57) ABSTRACT

A trigger point and acupoint stimulator (1) for connecting to a fluid ejection device (900). The trigger point and acupoint stimulator (1) comprises: a base (10) and a least one contact member (201). The base (10) has a transmission channel (CL1, CL1'). The contact member (201) is movably provided on the base (10) and has an ejection channel (CL2, CL2'). A tail end of the contact member (201) directly contacts a skin surface, and the contact member (201) can switch between a closed position and a communicated position to eject a fluid provided by the fluid ejection device (900) and to cause the pressurized fluid to directly act on the skin surface.

9 Claims, 11 Drawing Sheets

(58) Field of Classification Search
CPC .......... A61M 2205/128; A61M 5/2053; A61M 5/2066
See application file for complete search history.

(56) References Cited

U.S. PATENT DOCUMENTS

| | | | | |
|---|---|---|---|---|
| 2013/0138143 A1* | 5/2013 | Chechelnitsky | A61H 39/04 | 606/204 |
| 2014/0276534 A1* | 9/2014 | Wood | A61M 5/30 | 604/500 |
| 2019/0015294 A1* | 1/2019 | Nazarian | A61H 15/00 | |
| 2019/0351140 A1* | 11/2019 | Huang | A61M 5/32 | |

FOREIGN PATENT DOCUMENTS

| | | |
|---|---|---|
| CN | 202161538 U | 3/2012 |
| CN | 107753267 A | 3/2018 |
| JP | 2001046464 A | 2/2001 |
| JP | 2009095545 A | 5/2009 |
| JP | 2009520539 A | 5/2009 |
| TW | M435268 U | 8/2012 |
| TW | M438273 U | 10/2012 |
| TW | M545591 U | 7/2017 |
| WO | WO2005041843 A2 | 5/2005 |
| WO | WO2005041843 A3 | 5/2005 |
| WO | WO2011074718 A1 | 6/2011 |

OTHER PUBLICATIONS

Taiwan Patent Office, Office Action, Patent Application Serial No. 108133331, May 22, 2020, Taiwan.
Taiwan Patent Office, Office Action, Patent Application Serial No. 108133331, Nov. 9, 2020, Taiwan.
Japan Patent Office, Office Action, Patent Application No. 2021-515184, Nov. 29, 2022, Japan.
Japan Patent Office, Office Action, Patent Application Serial No. 2021-212184, May 17, 2022, Japan.
European Patent Office, Search Report, Patent Application No. 19861863.9, May 19, 2022, Europe.
China Patent Office, Office Action, Application Serial No. 201900585707, Jul. 29, 2023, China.

* cited by examiner

TRIGGER POINT AND ACUPOINT STIMULATOR

FIELD OF THE INVENTION

The present invention relates to a myofascial trigger point and acupuncture point stimulator, and, in particular, to a myofascial trigger point or acupuncture point stimulator acting on the surface of human skin.

BACKGROUND OF THE INVENTION

Medical devices have advanced as technology has developed. For example, a technology called "Extracorporeal shockwave therapy (ESWT)" has been created. "Extracorporeal shockwave therapy" uses mechanical waves to transmit energy to deep tissues under the skin, producing various effects, such as releasing growth factors of the tissues and facilitating blood circulation. Therefore, the tissue may be repaired and the pain level may be lowered. At the same time, various trigger points and acupuncture points under human skin may be massaged and stimulated. However, although the extracorporeal shock wave may stimulate on human body parts, there is no fluid which is directly in contact with the skin, and is permeating or penetrating through the skin surface; then have actions as fluid-related treatments or stimulation. Therefore, to facilitate fluid-related treatment modality on myofascial trigger points and acupuncture points on the human skin, it is important to provide a better way to achieve this goal.

BRIEF SUMMARY OF THE INVENTION

An embodiment of the present invention provides a myofascial trigger point and acupuncture point stimulator, configured to connect a fluid ejection device and transmit a fluid pressure to the skin surface, which is in direct contact with the myofascial trigger point and acupuncture point stimulator. The stimulator includes a base and at least one contact member. The base has a transmission channel. The contact member is movably disposed on the base and has a discharge channel. One end of the contact member is configured to be in contact with the skin surface directly. The contact member is switchable between a closed position and a communication position. When the contact member moves from the closed position to the communication position relative to the base, the discharge channel of the contact member changes from not communicating with the transmission channel to communicating with the transmission channel for ejecting the fluid provided by the fluid ejection device on the skin surface.

In one of the embodiments, the base includes a body and a fixed tube. The fixed tube is disposed on the body. The transmission channel passes through the fixed tube. The contact member is movably disposed on the fixed tube.

In one of the embodiments, the myofascial trigger point and acupuncture point stimulator further includes a stopper ring disposed at one end of the fixed tube. An entrance of the discharge channel is located at one side of the stopper ring and stopped by the stopper ring to not communicate with the transmission channel when the contact member is in the closed position. The entrance passes through the stopper ring to another side of the stopper ring to communicate with the transmission channel when the contact member is in the communication position.

In one of the embodiments, the discharge channel of the contact member has an L-shaped or T-shaped structure. The stopper ring is closer to the body than the entrance when the contact member is in the closed position. The entrance is closer to the body than the stopper ring when the contact member is in the communication position.

In one of the embodiments, the myofascial trigger point and acupuncture point stimulator further includes a resilient member disposed around the fixed tube and connecting the fixed tube with the contact member, so that the contact member is slidable on the fixed tube.

In one of the embodiments, the myofascial trigger point and acupuncture point stimulator further includes a seal ring disposed around an outer surface of the fixed tube. The seal ring is located between the contact member and the fixed tube. The seal ring abuts an inner wall of the contact member.

In one of the embodiments, the myofascial trigger point and acupuncture point stimulator further includes a plurality of contact members. Each contact member has a central axis. 60 to 90 degree angles are formed between the adjacent central axes of the contact members.

In one of the embodiments, the contact member includes a plurality of movable tubes partially inserted into the base. The movable tubes are movable relative to the base and switchable between the closed position and the communication position. Each entrance of the discharge channel of the movable tubes is blocked by a casing of the base when the movable tubes are in the closed position. Each discharge channel of the movable tubes communicates with the transmission channel of the base when the movable tubes are in the closed position.

In one of the embodiments, the contact member further comprises an abutting unit disposed on the movable tubes, wherein the abutting unit has materials of silicone, rubber, or thermoplastic elastomer (TPE).

In one of the embodiments, the myofascial trigger point and acupuncture point stimulator further includes a resilient member disposed between the movable tubes and connecting the abutting unit with the base. The movable tubes are switchable between the closed position and the communication position via the resilient member. In one of the embodiments, the myofascial trigger point and acupuncture point stimulator further includes a chuck disposed at the base and adsorbed to the skin surface.

DESCRIPTION OF THE DRAWINGS

The present invention can be more fully understood by reading the subsequent detailed description and examples with references made to the accompanying drawings, wherein.

DESCRIPTION OF THE REFERENCE SIGNS IN THE DRAWINGS

1, 1', 1'', 1''', 1''''~myofascial trigger point and acupuncture point stimulator;
10, 10'~base;
101~body;
102~fixed tube assembly;
1021~fixed tube;
1021R~outer surface;
10'F~casing;
20,20'~ contact assembly;
201, 201'~ contact member;
201C~ends;
2011~ tube body;
2011'~ movable tube;
20111'~protruding structure;
2012~extending portion;
2013'~abutting unit;
30~positioning ring assembly;
31~upper positioning ring;
32~lower positioning ring;
401~chuck;
900~fluid ejection device;
900'~embarkation type fluid ejection device;
1000~myofascial trigger point and acupuncture point stimulating system;
B1~stopper ring;
B2~seal ring;
C~central axis;
CL1, CL1'~transmission channel;
CL2, CL2'~discharge channel;
D1~first direction;
D2~second direction;
E, E'~resilient member;
F1, F2~force;
G~gap;
IW~inner wall;
JR~ejection system;
SP~space;
SS~skin surface;
S1~one side;
S2~another side.

DETAILED DESCRIPTION OF THE INVENTION

The other scopes that can be applied to the present disclosure will be clear in the following descriptions. It should be understood that the following detailed description and embodiments, with respect to exemplary embodiments of the devices, are provided merely to illustrate and not intend to be limiting the invention.

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

Figure 1:
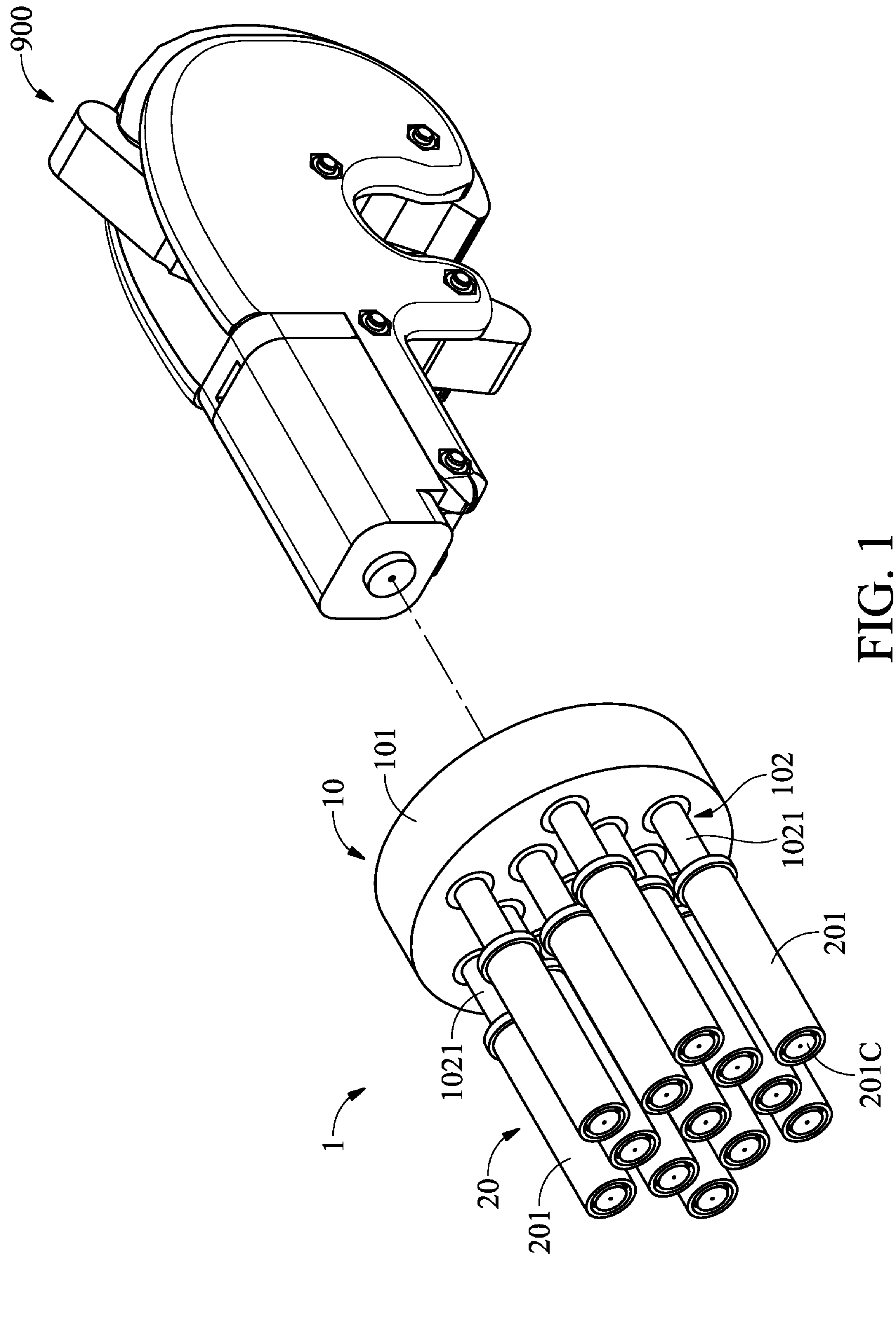
FIG. 1 shows a schematic view of a myofascial trigger point and acupuncture point stimulator and an ejection device in accordance with an embodiment of the present invention.

Referring to FIG. 1, FIG. 1 shows a schematic view of a myofascial trigger point and acupuncture point stimulator 1 and a fluid ejection device 900 in accordance with an embodiment of the present invention. As shown in FIG. 1, the acupuncture point stimulator 1 may be a stimulating device for stimulating a myofascial trigger point, an acupuncture point, and skin of a human body, including a base 10 and a contact assembly 20. The fluid ejection device 900 may be an ejection device holding fluids of medical use, ejecting the fluid(s) to a myofascial trigger point, an acupuncture point, or skin of a human body. The fluids may consist of gas and/or liquid, such as hydrogen, oxygen, nitrogen, carbon dioxide, ozone, nitrous oxide, or any other suitable gas or liquid for anesthesia. The myofascial trigger point and acupuncture point stimulator 1 may be installed at a front end of the fluid ejection device 900, performing stimulation of the acupuncture point and the skin of the human body. The fluid inside the fluid ejection device 900 may pass through the myofascial trigger point and acupuncture point stimulator 1 to the acupuncture point and the skin of the human body. It should be noted that the fluid ejection device 900 is not limited to the one illustrated in FIG. 1, but it may be any other types of ejection device. For example, the fluid ejection device may be a box shape ejection device with a long connecting tube that is connected to the myofascial trigger point and acupuncture point stimulator 1. The structure of aforementioned myofascial trigger point and acupuncture point stimulator 1 will be described in detail below.

Figure 2:
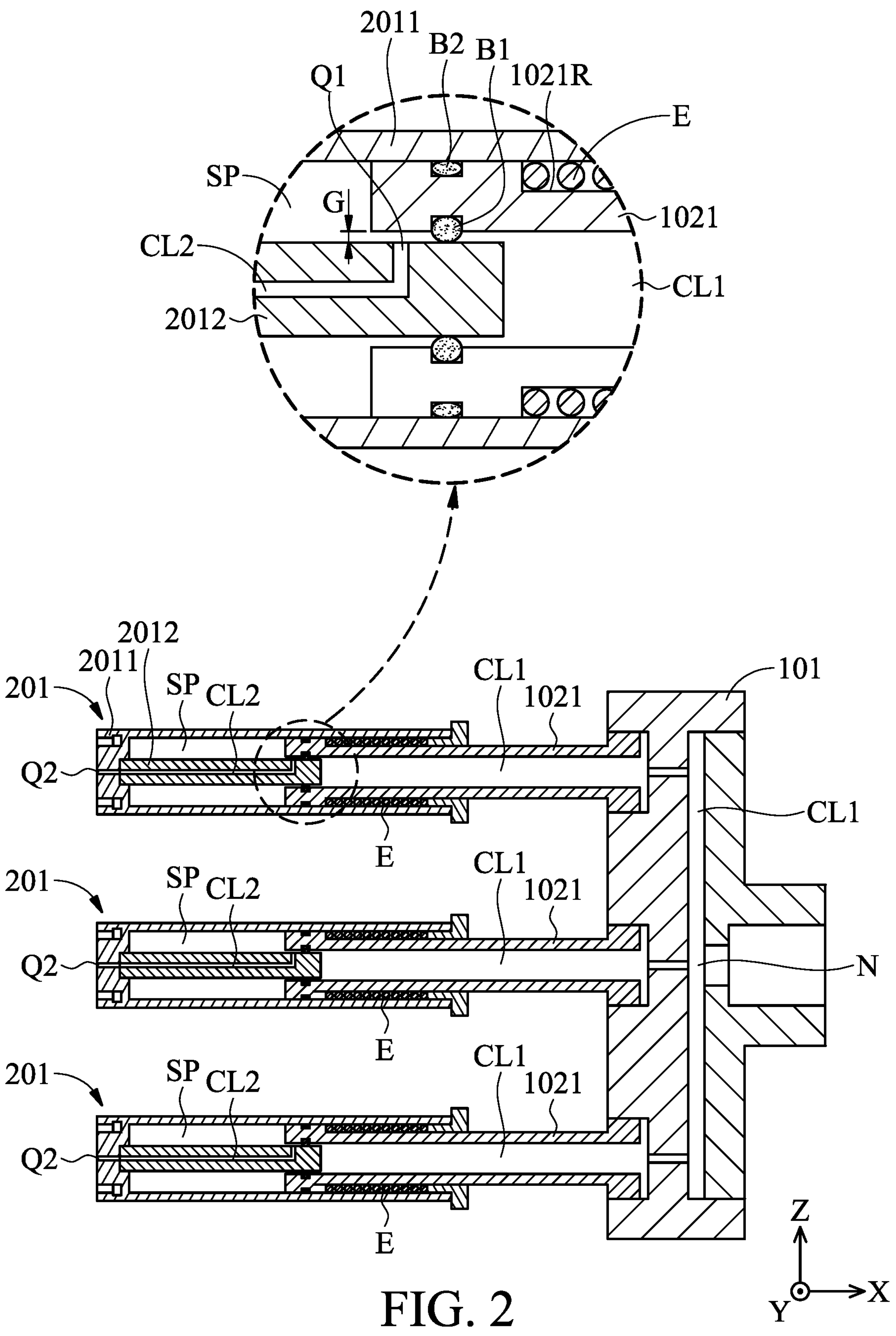
FIG. 2 shows a cross-sectional schematic view of the myofascial trigger point and acupuncture point stimulator in FIG. 1.

Refer to the myofascial trigger point and acupuncture point stimulator 1 shown in FIGS. 1-2. FIG. 2 shows a cross-sectional schematic view of the aforementioned myofascial trigger point and acupuncture point stimulator 1. It should be noted that three contact members 201 are illustrated in FIG. 2 for concise and clear purposes. The myofascial trigger point and acupuncture point stimulator 1 generally includes the base 10 and the contact assembly 20. The base 10 includes a body 101 and a fixed tube assembly 102 that is fixedly disposed on the body 101 and protrudes from the body 101. The fixed tube assembly 102 includes a plurality of fixed tubes 1021 (there are thirteen of fixed tubes in the present embodiment). Each of the fixed tubes 1021 has a long structure. The contact assembly 20 includes a plurality of long contact members 201. The number of the contact members 201 equals to the number of the aforementioned fixed tubes 1021. The contact members 201 are disposed on the fixed tubes 1021 and surrounding the fixed tubes 1021. Ends 201 C of the contact members 201 may be in direct contact with human skin.

The myofascial trigger point and acupuncture point stimulator 1 further includes a resilient member E that surrounds an outer surface 1021R of the fixed tube 1021. In other words, the fixed tube 1021 is located inside the resilient member E that may be an extension spring. In the direction of z-axis, the resilient member E is located between the contact member 201 and the fixed tube 1021. The contact member 201 is movably disposed on the fixed tube 1021 via the resilient member E.

For a more detailed description, the aforementioned contact member 201 may act as a movable tube with a tube body 2011 and an extending portion 2012. The extending portion 2012 is fixedly disposed inside the tube body 2011. The end of the extending portion 2012 is partially accommodated in the fixed tube 1021. In the direction of z-axis, the extending portion 2012 at least partially overlaps the fixed tube 1021. There is a gap G between the extending portion 2012 and the fixed tube 1021.

The aforementioned base 10 has a transmission channel CL1 that is located inside the body 101 and passes through every fixed tube 1021. A portion of the extending portion 2012 of the contact member 201 is disposed in the transmission channel CL1. The extending portion 2012 has a discharge channel CL2 with an L-shaped structure.

The myofascial trigger point and acupuncture point stimulator 1 further includes a stopper ring B1 that is disposed at one end of the fixed tube 1021, stopping the gas or liquid in the transmission channel CL1 from entering the discharge channel CL2. The stopper ring B1 and its function will be described in detail in the following paragraphs. There is a one-way valve installed in the body 101, connecting the aforementioned transmission channel CL1, so that gas or liquid may enter from the body 101 unidirectionally, effectively preventing recirculation from happening.

Figure 3:
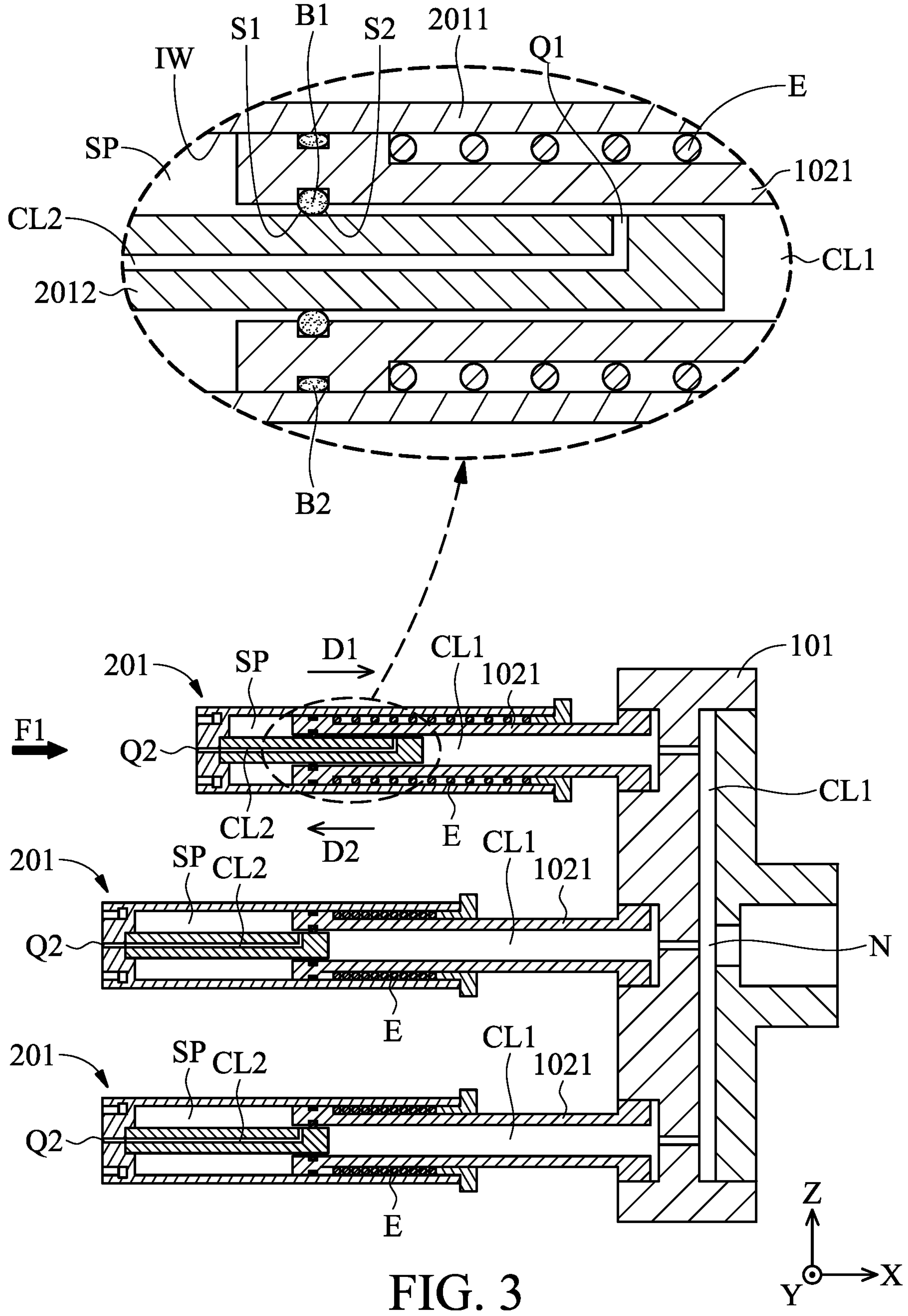
FIG. 3 shows a cross-sectional schematic view of one of the contact members of the contact assembly in the communication position.

FIG. 3 shows a schematic view of one of the contact members 201 (the top contact member 201 in FIG. 3) of the contact assembly 20 in the communication position, while other contact members 201 are in the closed position. The aforementioned contact members 201 may be switchable between the closed position and the communication position relative to the fixed tubes 1021 of the base 10. Specifically, when a force F1 is applied to the contact members 201, the contact members 201 move in the first direction D1 relative to the base 10, along the fixed tubes 1021 toward the body 101. At this moment, the entrance Q1 of the discharge channel CL2 of the extending portion 2012 of the contact member 201 crosses over the stopper ring B1. The entrance Q1 crosses the stopper ring B1 from one side S1 to another side S2, so that the entrance Q1 becomes closer to the body 101 than the stopper ring B1. The discharge channel CL2 communicates with the transmission channel CL1, so that the gas or liquid in the transmission channel CL1 may pass through the discharge channel CL2, discharged from the outlet Q2 of the discharge channel CL2, performing stimulation of the skin, the myofascial trigger point and acupuncture point of human body.

Similarly, when the force F1 applied to the contact members 201 disappears, the contact members 201 may return to the closed position by the returning spring force of the resilient member E. At this moment, the discharge channel CL2 of the contact member 201 moves further away from the body 101, i.e. in the second direction D2, returning from another side S2 to the side S1. The entrance Q1 of the discharge channel CL2 is blocked by the stopper ring B1, as shown in FIG. 2, so that the gas or liquid in the transmission channel CL2 is no longer in communication with the discharge channel CL2. As a result, the outlet Q2 of the discharge channel CL2 is stopped from discharging gas or liquid.

Figure 4:
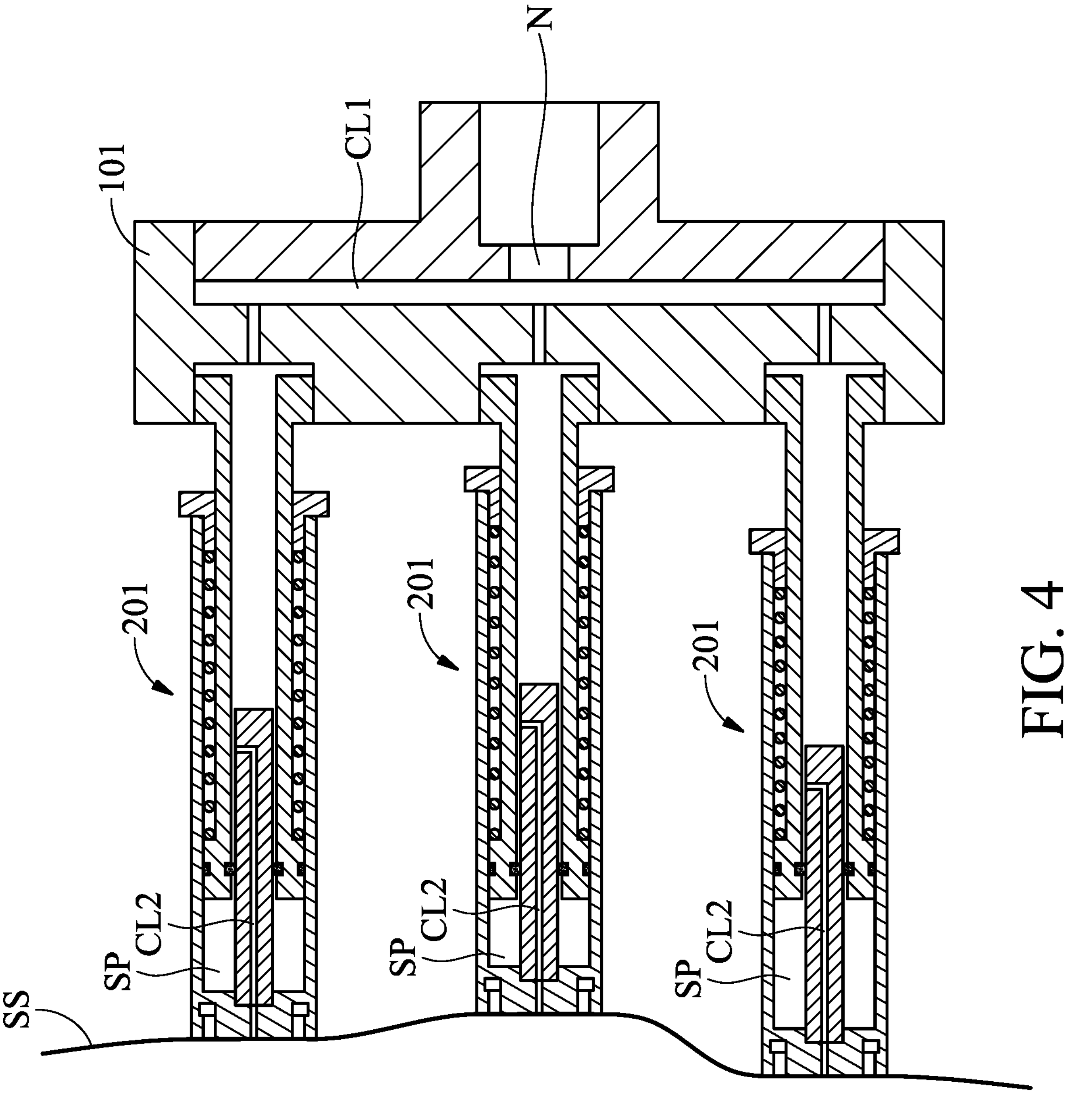
FIG. 4 shows a schematic view of a plurality of contact members fit closely on the skin surface.

Therefore, since the contact members 201 is movably disposed on the base 10, switchable between the closed position and the communication position depending on whether a pressure is applied or not, the contact members 201 are extended or compressed, controlling the discharge of gas or liquid, thereby improving the convenience of usage. In addition, the discharge channel CL2 may communicate with the transmission channel CL1 simply by making the entrance Q1 of the discharge channel CL2 cross over the stopper ring B1. Thus, the contact members 201 may follow the bumpy contour of the skin while transmitting gas or liquid, adequately fit on the skin surface SS for valid contact, as shown in FIG. 4, broadening the range of usability.

As such, the transmission channel CL1 of the contact member 201 of the present embodiment pressurizes the liquid in direct contact with the skin, so that the liquid may be applied directly to the skin surface in a short period of time, stimulating the myofascial trigger points or acupuncture points, such as fasciae, nerves, muscles, or joints etc. In comparison with previous technology of extracorporeal shockwave therapy (ESWT), the stimulator of the present application is more effective since it not only has the effect of mechanical energy produced by fluid pressure, but it also has the effect produced by the particles of fluid itself that is applied to the skin for the tissues.

In addition, a seal ring B2 is disposed on the exterior of the fixed tubes 1021, the inner wall IW of the tube body 2011 of the contact member 201, and the outer surface 1021R of the fixed tube 1021, for further preventing liquid or gas from overflow or effusion. For example, when the stopper ring B1 does not fully seal/block the gap G, the fluid may pass through the stopper ring B1 and enter the space SP of the tube body 2011. By installing the seal ring B2, the fluid may be effectively stopped from entering the space accommodating the resilient member E or from further effusion. The fluid is at least maintained in the space SP, being able to pass through the stopper ring B1 again and then enter the entrance Q1, following the normal flowing direction.

Figure 5B:
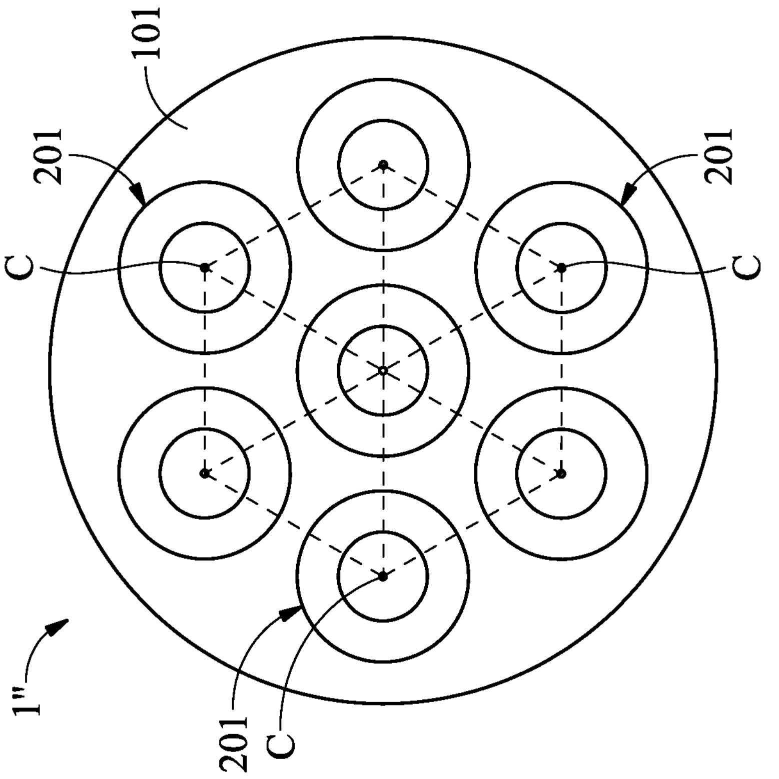
FIG. 5B shows a schematic view of the myofascial trigger point and acupuncture point stimulator in accordance with another embodiment of the present invention.
Figure 5A:
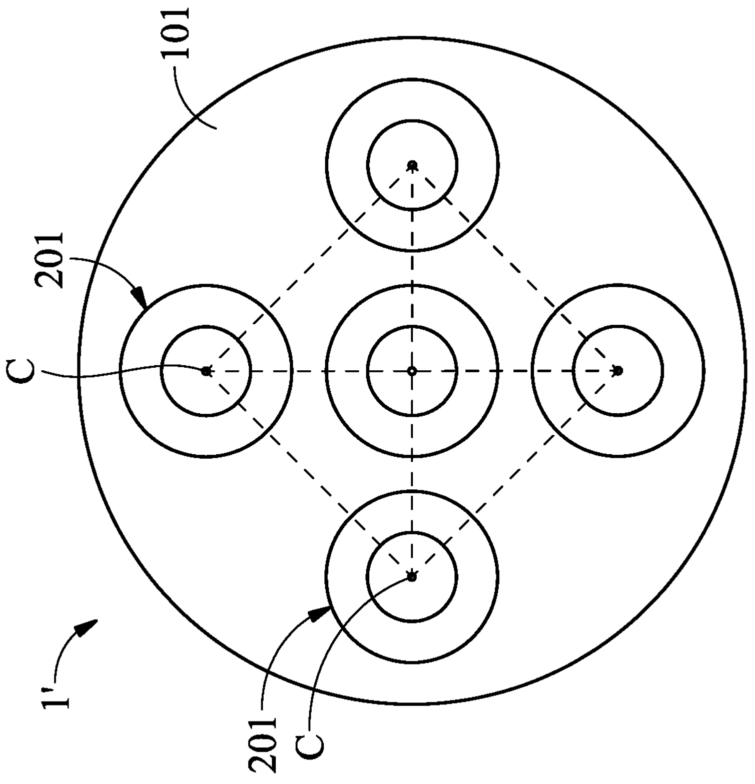
FIG. 5A shows a schematic view of the myofascial trigger point and acupuncture point stimulator in accordance with another embodiment of the present invention.

It should be understood that, in the present embodiment, while the aforementioned contact assembly 20 is illustrated to have a plurality of (thirteen) contact members 201 formed in a honeycomb shape, the contact assembly 20 may have a different amount of contact members 201, such as five, seven (see the myofascial trigger point and acupuncture point stimulator 1' and 1" shown in FIGS. 5A-5B), or any other suitable numbers. The number of the fixed tubes 1021 of the fixed tube assembly 102 of the base 10 matches the number of the contact members 201. When there are five contact members 201, 60 or 90 degree angles are formed between the connecting lines (the dashed lines) of central axes C of adjacent contact members 201. When there are seven contact members 201, 60 degree angles are formed between the connecting lines of central axes C of adjacent contact members 201. In some embodiments, 60 to 90 degree angles are formed between the connecting lines (the dashed lines) of central axes C of adjacent contact members 201. In some embodiments, the contact assembly 20 may only include one contact member 201, equipped with the base 10 with only one fixed tube 1021, which may still stimulate the skin, the myofascial trigger point and acupuncture point of human body.

In addition, the discharge channels CL2 of the contact members 201 are shown as having L-shaped structures in the present embodiment. In another embodiment, the discharge channels CL2 may have T-shaped structures. That is, each of the upper and lower sides of the discharge channel CL2 (in the direction of z-axis) has one entrance Q1, respectively. When in the communication position, the two entrances of the discharge channel CL2 both cross over the stopper ring B1, communicating with the transmission channel CL1.

Therefore, liquid may flow into the discharge channel CL2 and be discharged from the outlet Q2.

Figure 5D:
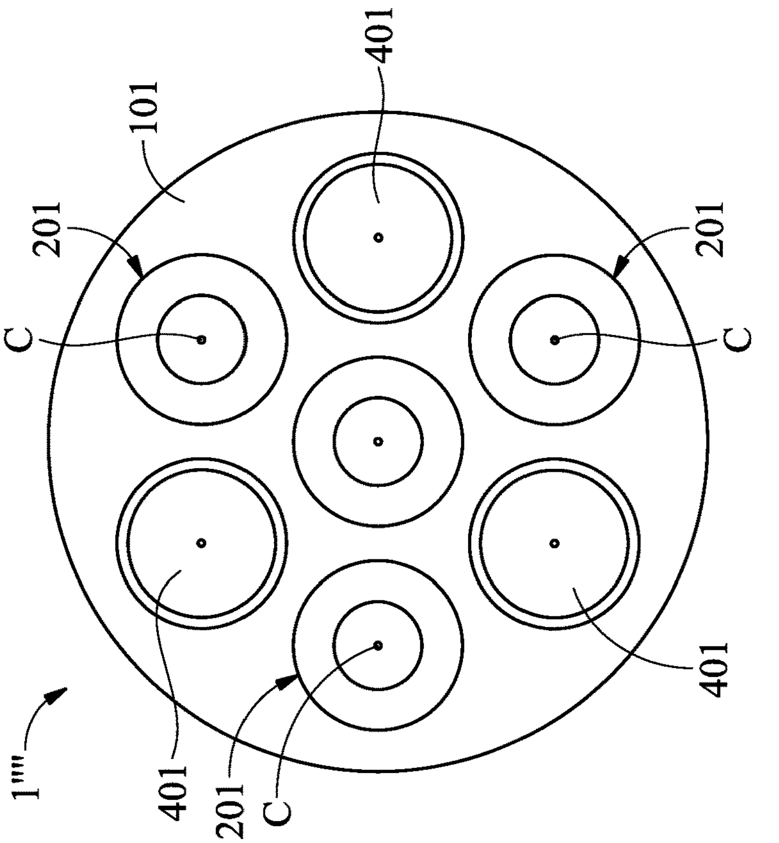
FIG. 5D shows a schematic view of the myofascial trigger point and acupuncture point stimulator in accordance with another embodiment of the present invention.
Figure 5C:
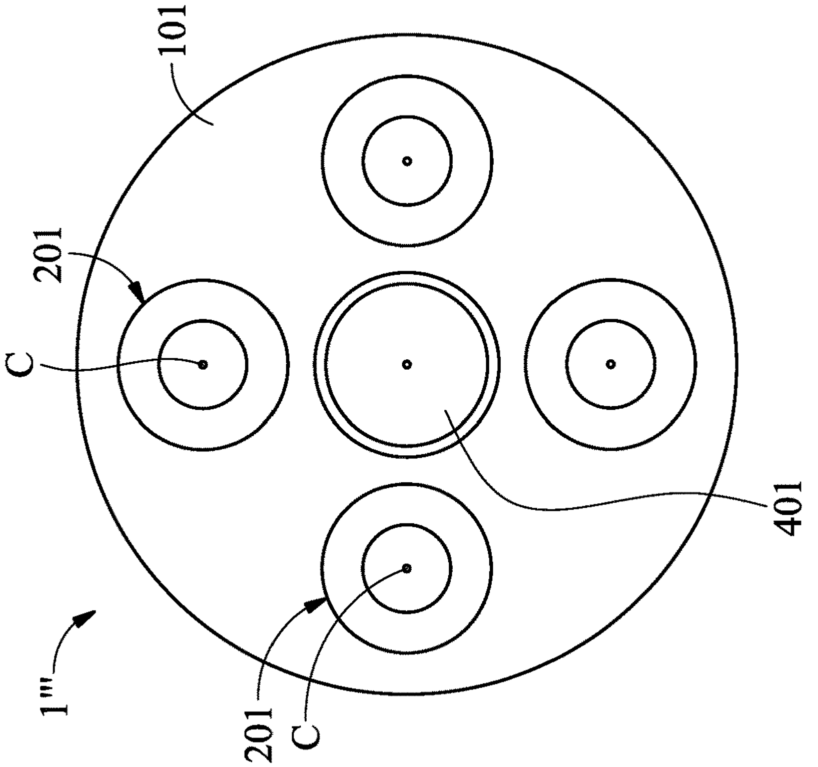
FIG. 5C shows a schematic view of the myofascial trigger point and acupuncture point stimulator in accordance with another embodiment of the present invention.

In some other embodiments, the myofascial trigger point and acupuncture point stimulator may further include one or more chucks 401 that may be negative pressure vacuum chucks and disposed at the base 10, as the myofascial trigger point and acupuncture point stimulators 1''' and 1'''' shown in FIGS. 5C-5D. One or more of the pluralities of contact members 201 of the contact assembly 20 may be changed to one or more chucks 401 for sucking on the skin surface. For example, the contact member 201 in the center in FIG. 5A may be changed to a chuck 401. As shown in FIG. 5C, the contact members 201 are disposed around the chuck 401. Alternatively, a chuck 401 is disposed adjacent to every adjacent contact member 201, such as the three chucks 401 shown in FIG. 5D. In other words, a chuck 401 is disposed at the location where it is adjacent to every contact member 201. As a result, when the myofascial trigger point and acupuncture point stimulator 1 contacts the skin surface SS, it may suck onto the skin by the chucks 401, securing the myofascial trigger point and acupuncture point stimulator 1, preventing it from shaking or shifting, further improving the convenience of the myofascial trigger point and acupuncture point stimulator 1 and its stimulating effect.

In some embodiments, the length of the chucks 401 may be equal to the length of the aforementioned contact members 201 (in the direction of x-axis). The chucks 401 may also be extendable and compressible. That is, the chucks 401 may be extended or compressed along with the contact members 201 for fitting on the skin surface SS when in contact. The chucks 401 may be connected to a negative pressure chamber. When the chamber has negative pressure, the chucks 401 may suck on the skin.

Figure 6:
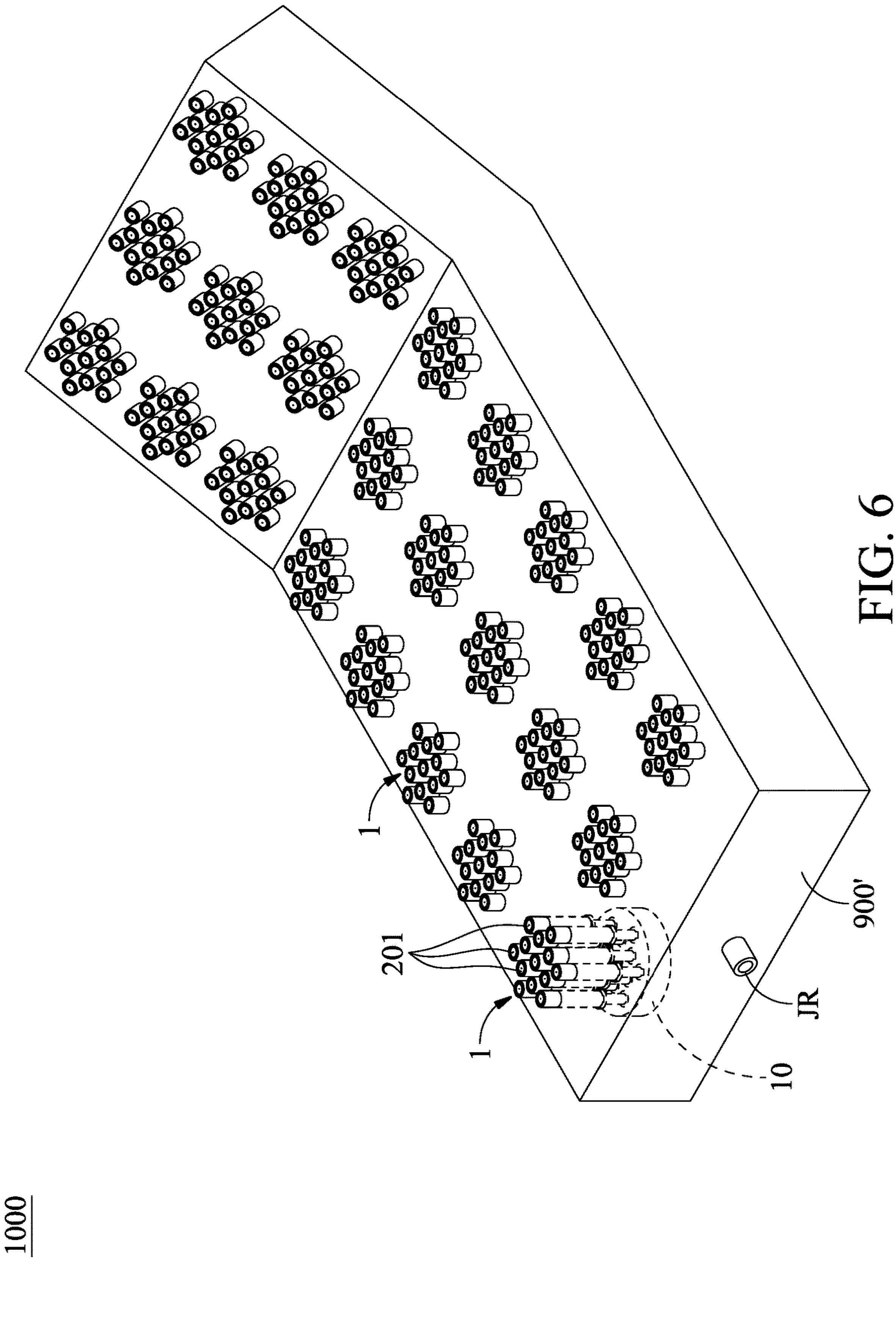
FIG. 6 show a schematic view of a plurality of myofascial trigger point and acupuncture point stimulators equipped on an embarkation type ejection device, making it a myofascial trigger point and acupuncture point stimulating system.

FIG. 6 show a schematic view of a plurality of myofascial trigger point and acupuncture point stimulators 1 equipped on an embarkation type ejection device 900', making it a myofascial trigger point and acupuncture point stimulating system 1000. The embarkation type ejection device 900' may be a mattress equipped with an ejection system JR that may communicate with an external device for supplying liquid (not shown). The plurality of myofascial trigger point and acupuncture point stimulators 1 are disposed on the surface of the embarkation type ejection device 900'. The bases 10 of the myofascial trigger point and acupuncture point stimulators 1 are embedded inside the embarkation type ejection device 900' while the contact members 201 are exposed. The transmission channels CL1 of the bases 10 communicate with the ejection system JR for the liquid to flow pass the transmission channels CL1.

When a human body lies or sits on this myofascial trigger point and acupuncture point stimulating system 1000, the hip, the thigh, the hands, the scalp, the neck, and the back (but not limited thereto) etc. are pressed by the myofascial trigger point and acupuncture point stimulators 1. By the communication between the transmission channels CL1 with the discharge channels CL2, fluid for pressing the myofascial trigger point and acupuncture point is discharged for stimulation. When the human body leaves the myofascial trigger point and acupuncture point stimulating system, the transmission channels CL1 no longer communicate with the discharge channels CL2, so that the liquid supply is stopped. As a result, not only that every body parts of a human body may fit on the myofascial trigger point and acupuncture point stimulating system for effective stimulation of myofascial trigger point and acupuncture point, but it also improves the convenience by stopping the liquid supply once the human body leaves the system. Further, it may prevent the majority of the pressurized liquid from leaking and losing from the non-contacting points because the resistance there is much smaller than that of the contacting points. In some other embodiments, the myofascial trigger point and acupuncture point stimulator 1 may form another myofascial trigger point and acupuncture point stimulating system by being equipped with other types of ejection systems 900', such as, with a seat type ejection device that allows users to sit on this myofascial trigger point and acupuncture point stimulating system for stimulation: or with a pillow type ejection device that allows users to rest their head on the system for stimulation.

Figure 7:
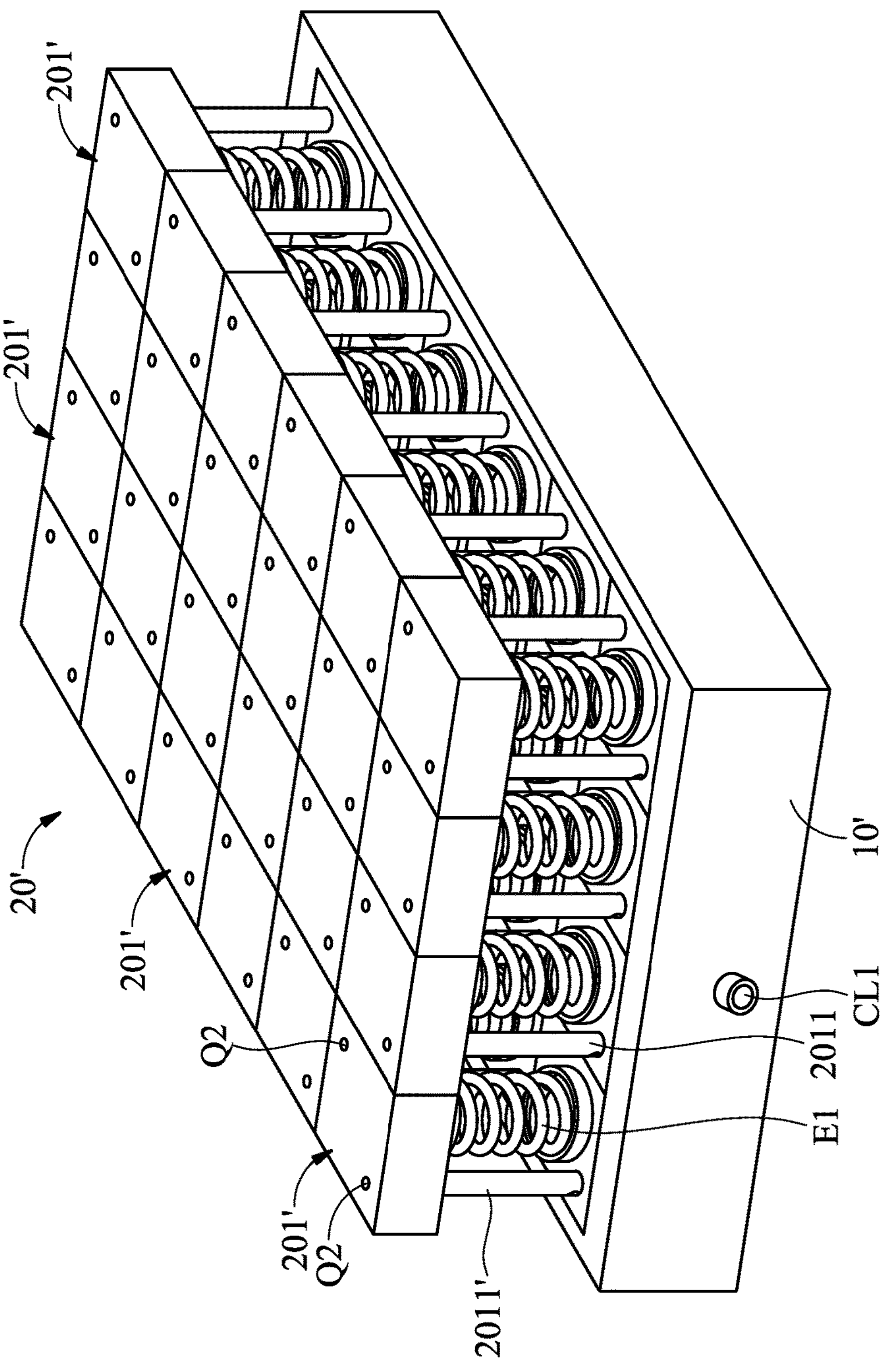
FIG. 7 shows a schematic view of the myofascial trigger point and acupuncture point stimulator in accordance with another embodiment of the present invention.

FIG. 7 shows a schematic view of the myofascial trigger point and acupuncture point stimulator 2 in accordance with another embodiment of the present invention. The myofascial trigger point and acupuncture point stimulator 2 may also act as a stimulating device for stimulating acupunctures points or skin of human bodies, including a base 10' and a contact assembly 20' for contacting the myofascial trigger point and acupuncture point or skin of a human body, ejecting the medical liquid from or stored in the base 10' out to the human body. The detailed structures of the base 10' and the contact assembly 20' will be described below.

Figure 8:
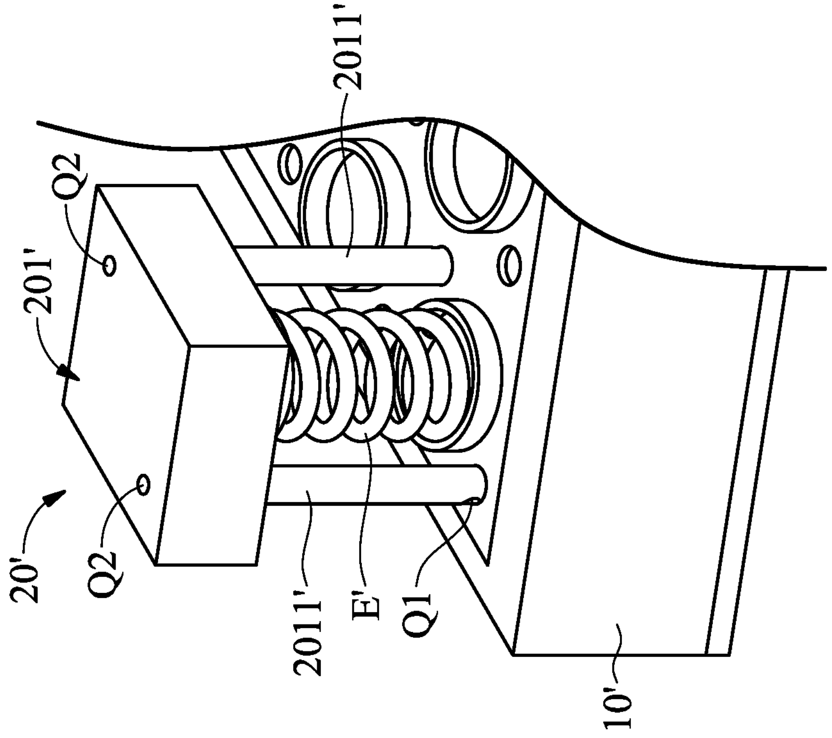
FIG. 8 shows a schematic view of a contact member of the contact assembly and a portion of the base.
Figure 9:
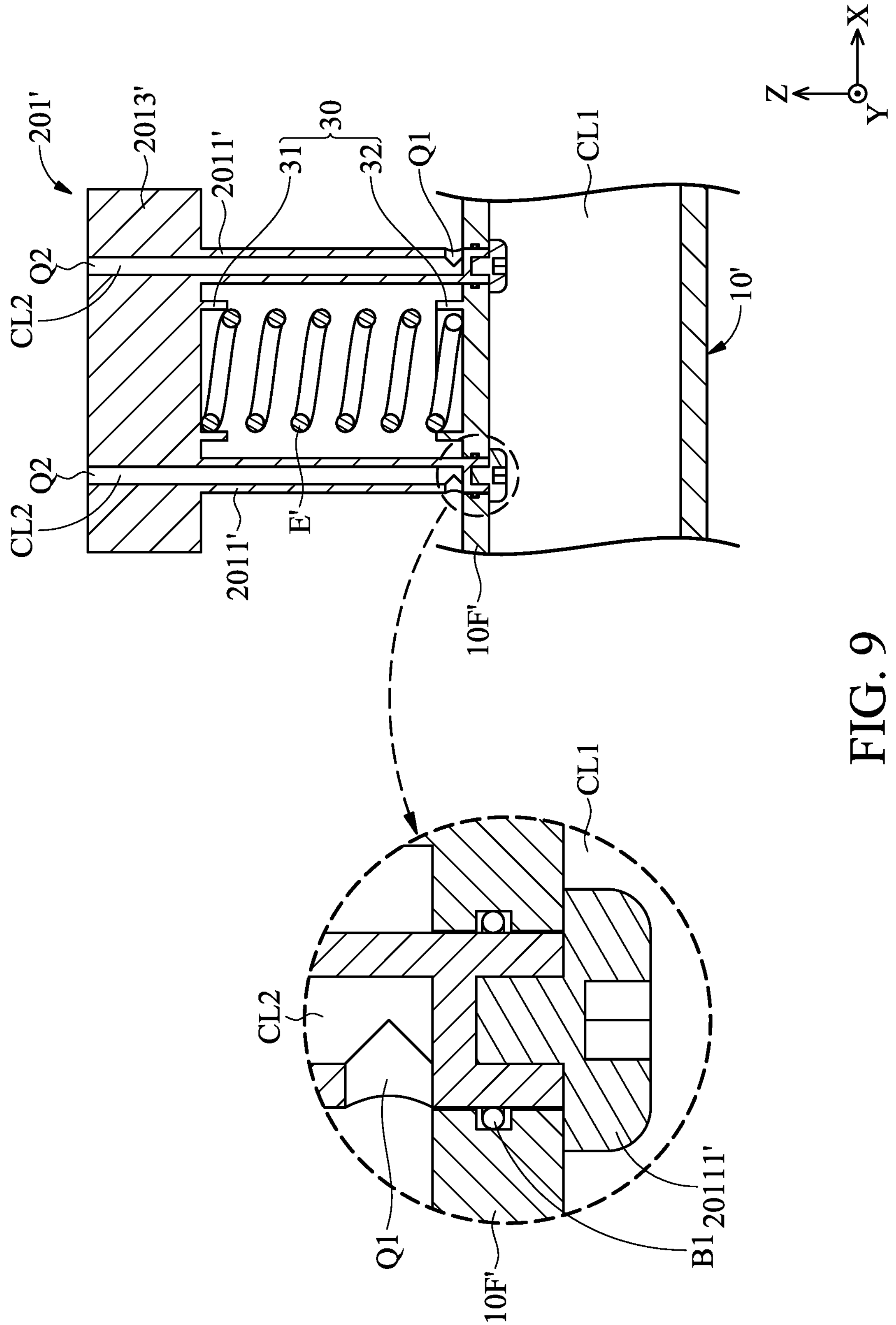
FIG. 9 shows a cross-sectional schematic view of the contact member disposed at the base in the closed position.

Referring to FIGS. 8-9, FIG. 8 shows a schematic view of a contact member 201' of the contact assembly 20' and a portion of the base 10': FIG. 9 shows a cross-sectional schematic view of the contact member 201' disposed at the base 10'. In the present embodiment, the contact assembly 20' includes a plurality of contact members 201'. Each of the contact members 201' has a plurality of (two) movable tubes 2011' inserted into the base 10'. The end of the movable tube 2011' that is closer to the base 10' has a protruding structure (on the XY plane) 20111' for snapping onto the base 10'. The protruding structure may have a structure that is like a nut, or any other structure that is suitable for snapping onto the base 10'. The other end that is further away from the base 10' has an abutting unit 2013' for fitting closely on the human skin surface. The abutting unit 2013' may include materials such as silicone, rubber, or thermoplastic elastomer (TPE), etc. In the present embodiment, the abutting unit 2013' has a rectangular structure. In some other embodiments, the abutting unit 2013' may have a polygonal structure, such as a triangular or pentagonal structure.

A resilient member E', which may be a compress spring, is disposed between the two movable tubes 2011'. The myofascial trigger point and acupuncture point stimulator 2 further includes a positioning ring assembly 30 that has an upper positioning ring 31 and a lower positioning ring 32. The upper positioning ring 31 and the lower positioning ring 32 are disposed at the abutting unit 2013' and the base 10', respectively. The upper positioning ring 31 and the lower positioning ring 32 are located outside the resilient member E' for positioning the resilient member E'. The stopper ring B1 is installed within the casing 10F' of the base 10' to surround the outer surface of the movable tube 2011'.

In comparison with the previous embodiment 1, the contact member 201' (or the movable tube 2011' thereof) is directly inserted into the base 10' in the present embodiment. The fixed tube in the previous embodiment is not required to be installed to the base 10', thereby reducing the production cost and lowering the difficulty of assembling.

Figure 10:
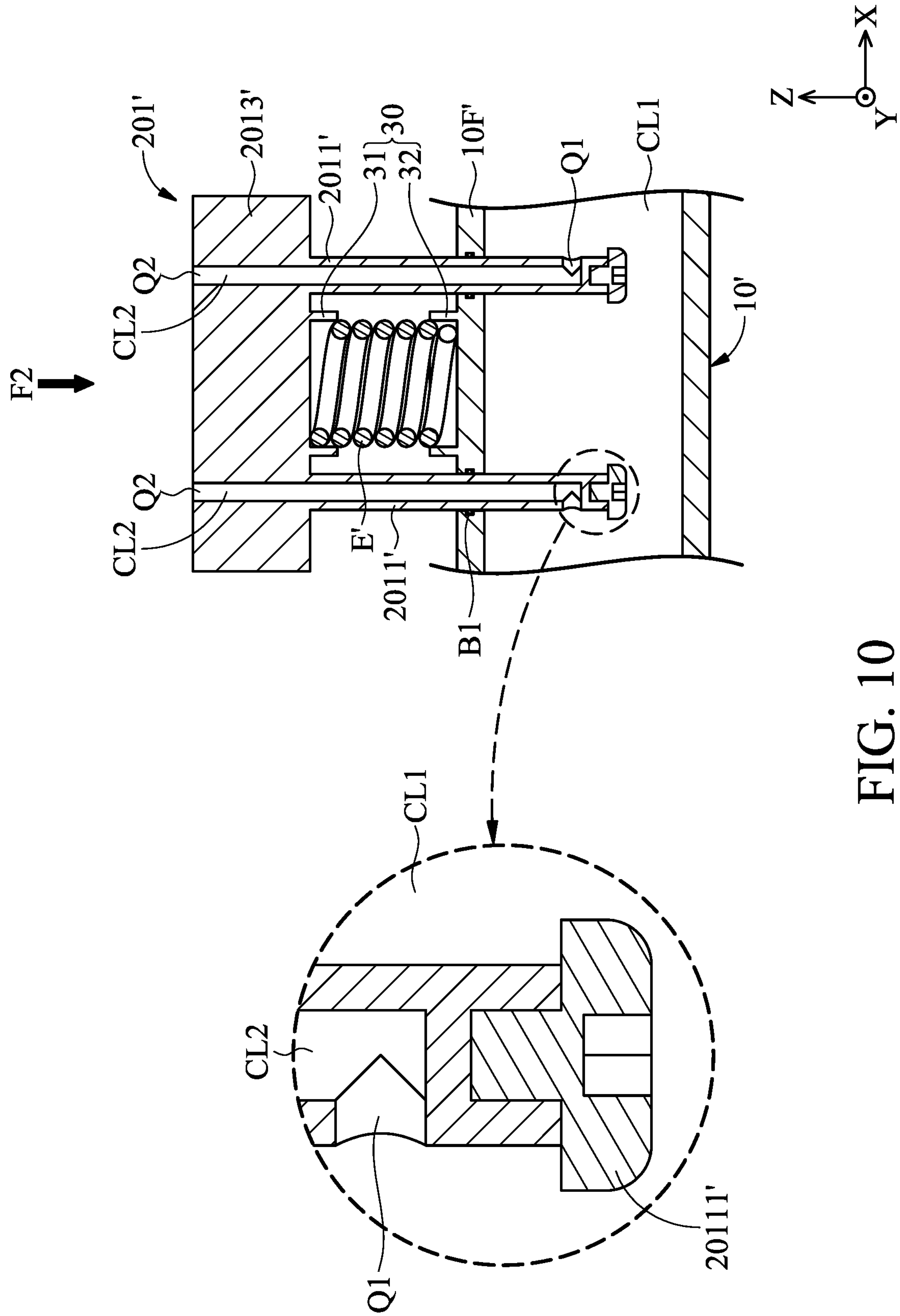
FIG. 10 shows a cross-sectional schematic view of the contact member in the communication position relative to the base.

Referring to FIG. 10, when a force F2 is applied to press the contact member 201', the movable tube 2011' of the contact member 201' moves toward the inside of the base 10', compressing the resilient member E'. At this moment, the entrance Q1 of the discharge channel CL2' of the movable tube 2011' communicates with the transmission channel CL1' inside the base 10', so that the fluid is no longer stopped by the stopper ring B1 and flowable. As such, fluid may flow along the transmission channel CL1' to the discharge channel CL2', discharged from the outlet Q2.

Similarly, when the aforementioned force F2 disappears, the compressed resilient member E' applies a resilient rebound force to the abutting unit 2013' of the contact member 201', so that the contact member 201' returns to its initial position relative to the base 10' (as shown in FIG. 9). At this moment, the entrance Q1 of the discharge channel CL2' no longer communicates with the transmission channel CL1'. The entrance Q1 is blocked and covered by the stopper ring B1 and the casing 10F' of the base 10', stopping the fluid from being discharged from the outlet Q2.

The myofascial trigger point and acupuncture point stimulator 2 of the present embodiment may also be equipped with the embarkation type ejection device 900', forming another myofascial trigger point and acupuncture point stimulating system. For example, in the same or similar manner, the base 10' is embedded inside the embarkation type ejection device 900', exposing the contact member 201'. When a human body leans or sits on the system, the pressed contact member 201' may move downward, so that the discharge channel CL2' communicates with the transmission channel CL1', and then fluid may be discharged.

In summary, the embodiment of the present invention provides a myofascial trigger point and acupuncture point stimulator, configured to connect a fluid ejection device. The stimulator includes a base and at least one contact member. The base has at least one transmission channel. The contact member is movably disposed on the base and has a discharge channel. The contact member is switchable between a closed position and a communication position. When the contact member moves from the closed position to the communication position relative to the base, the discharge channel of the contact member changes from not communicating with the transmission channel to communicating with the transmission channel for ejecting the fluid provided by the fluid ejection device.

The embodiments of the present invention at least has one of the following advantages or functionalities: the contact member may switch between the closed position and the communication position so that the discharge channel communicates or not communicates with the transmission channel, improving the convenience for stimulating the myofascial trigger point and acupuncture point of human bodies; the contact assembly that is configured with multiple movable contact members increases the fitness to the human skin surface, improving the ejection effect for human's body parts. In addition, the contact member is directly disposed on the base, reducing the assemble difficulty and the cost.

The terms “first”, “second”, and the like are merely generic identifiers and, as such, may be interchanged in various embodiments. For example, while an element may be referred to as a “first” element in some embodiments, the element may be referred to as a “second” element in other embodiments.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A myofascial trigger point and acupuncture point stimulator, configured to connect a fluid ejection device and transmit a fluid pressure to a skin surface in direct contact with the myofascial trigger point and acupuncture point stimulator, the stimulator comprising:

a base having a transmission channel and comprising a body and a fixed tube, wherein the fixed tube is disposed on the body, and the transmission channel passes through the fixed tube;

at least one contact member movably disposed on the base and having a discharge channel, wherein one end of the contact member is configured to be in contact with a skin surface directly, and the contact member is switchable between a closed position and a communication position, wherein the contact member is movably disposed on the fixed tube; and a stopper ring disposed at one end of the fixed tube;

wherein when the contact member moves from the closed position to the communication position relative to the base, the discharge channel of the contact member changes from not communicating with the transmission channel to communicating with the transmission channel for ejecting the fluid provided by the fluid ejection device on the skin surface;

wherein an entrance of the discharge channel is located at one side of the stopper ring and stopped by the stopper ring to not communicate with the transmission channel when the contact member is in the closed position, wherein the entrance passes through the stopper ring to another side of the stopper ring to communicate with the transmission channel when the contact member is in the communication position.

2. The myofascial trigger point and acupuncture point stimulator as claimed in claim 1, wherein the discharge channel of the contact member has an L-shaped or T-shaped structure, wherein the stopper ring is closer to the body than the entrance when the contact member is in the closed position, and wherein the entrance is closer to the body than the stopper ring when the contact member is in the communication position.

3. The myofascial trigger point and acupuncture point stimulator as claimed in claim 1, further comprising a resilient member disposed around the fixed tube and connecting the fixed tube with the contact member, so that the contact member is slidable on the fixed tube.

4. The myofascial trigger point and acupuncture point stimulator as claimed in claim 1, further comprising a seal ring disposed around an outer surface of the fixed tube, located between the contact member and the fixed tube, and abutting an inner wall of the contact member.

5. The myofascial trigger point and acupuncture point stimulator as claimed in claim 1, further comprising a plurality of contact members, wherein each contact member has a central axis, wherein 60 to 90 degree angles are formed between the adjacent central axes of the contact members.

6. The myofascial trigger point and acupuncture point stimulator as claimed in claim 1, wherein the contact member comprises a plurality of movable tubes partially inserted into the base, wherein the movable tubes are movable relative to the base and switchable between the closed position and the communication position;

wherein each entrance of the discharge channel of the movable tubes is blocked by a casing of the base when the movable tubes are in the closed position;

wherein each discharge channel of the movable tubes communicates with the transmission channel of the base when the movable tubes are in the closed position.

7. The myofascial trigger point and acupuncture point stimulator as claimed in claim 6, wherein the contact member further comprises an abutting unit disposed on the movable tubes, wherein the abutting unit has materials of silicone, rubber, or thermoplastic elastomer.

8. The myofascial trigger point and acupuncture point stimulator as claimed in claim 7, further comprising a resilient member disposed between the movable tubes and connecting the abutting unit with the base, wherein the movable tubes are switchable between the closed position and the communication position via the resilient member.

9. The myofascial trigger point and acupuncture point stimulator as claimed in claim 1, further comprising a chuck disposed at the base and adsorbed to the skin surface.

* * * * *